United States Patent [19]

Melby

[11] Patent Number: 5,054,885

[45] Date of Patent: Oct. 8, 1991

[54] LIGHT FIXTURE INCLUDING A PARTIALLY COLLIMATED BEAM OF LIGHT AND REFLECTIVE PRISMS HAVING PEAKS LYING ON A CURVED SURFACE

[75] Inventor: Jeffrey J. Melby, Saint Paul, Minn.

[73] Assignee: Minnesota Mining and Manfuacturing Company, Saint Paul, Minn.

[21] Appl. No.: 651,110

[22] Filed: Feb. 4, 1991

Related U.S. Application Data

[63] Continuation of Ser. No. 255,784, Oct. 11, 1988, abandoned.

[51] Int. Cl.[5] .......... F21V 7/00; G02B 27/14

[52] U.S. Cl. .......... 359/618; 362/348; 362/307; 362/26; 359/850; 359/638

[58] Field of Search .......... 350/171, 169, 616, 612, 350/286, 345; 362/26, 27, 348, 307, 247

[56] References Cited

U.S. PATENT DOCUMENTS

| | | | |
|---|---|---|---|
| 3,877,802 | 4/1975 | Greenspan | 350/616 |
| 4,011,001 | 3/1977 | Moriya | 350/345 |
| 4,127,771 | 1/1978 | Sick | 350/616 |
| 4,252,416 | 2/1981 | Jaccard | 362/26 |
| 4,420,261 | 12/1983 | Barlow et al. | 350/171 |
| 4,629,288 | 12/1986 | Wagers | 350/171 |
| 4,799,137 | 1/1989 | Aho | 350/286 |
| 4,874,228 | 10/1989 | Aho et al. | 362/26 |
| 4,914,553 | 4/1990 | Hamada et al. | 350/345 |

FOREIGN PATENT DOCUMENTS

| | | | |
|---|---|---|---|
| 123823 | 7/1985 | Japan | 350/345 |
| 23022 | 1/1987 | Japan | 350/345 |

*Primary Examiner*—Jon W. Henry

*Attorney, Agent, or Firm*—Gary L. Griswold; Walter N. Kirn; Stephen W. Buckingham

[57] ABSTRACT

A light fixture has a source of partially collimated light for emitting light having an axis of collimation. A structured surface has a plurality of prisms that are rendered reflective for reflecting light from the light source out of the cavity. The peaks of the prisms define a surface at least a portion of which makes an acute angle with the axis of collimation.

5 Claims, 2 Drawing Sheets

LIGHT FIXTURE INCLUDING A PARTIALLY COLLIMATED BEAM OF LIGHT AND REFLECTIVE PRISMS HAVING PEAKS LYING ON A CURVED SURFACE

This is a continuation of application Ser. No. 07/255,784 filed Oct. 11, 1988 now abandoned.

FIELD OF THE INVENTION

The present invention relates to thin light fixtures.

BACKGROUND OF THE INVENTION

In various situations thin light fixtures are desirable. For example, back-lit flat panel displays normally should be kept as thin as possible. When they are thinner they tend to be lighter in weight and more compact, both desirable properties when they are used in applications such as portable computers. Automobile taillights and brake lights also should be kept compact where possible. This is because space used by such lights comes at the expense of luggage space in the vehicle's trunk.

Various designs for thin panel lighting have been proposed. For example, copending, commonly assigned U.S. patent application Ser. No. 016,858, filed Feb. 20, 1987, now U.S. Pat. No. 4,789,921 describes a Fresnel-type reflector lying on a conic surface. Typically the Fresnel-type structures of that reflector are designed to mimic the performance of a parabolic reflector. The conic Fresnel provides a highly efficient compact light source, but suffers from the same disadvantage as other parabolic reflectors. That disadvantage is a lack of uniformity in intensity of light output. As may be expected, regions closer to the light source will be more brightly illuminated than those more distant from the light source.

Other designs have been proposed for use when uniform illumination is desirable. One such proposal is described in commonly assigned, copending U.S. patent application Ser. No. 030,033, filed Mar. 24, 1987 now U.S. Pat. No. 4,799,137. That design utilizes a film known as right angle film. The use of right angle film in a light fixture allows the output optical window to be very evenly illuminated, but requires the separate construction of the right angle film and the insertion of that film into the light fixture. In some situations it would be desirable to construct a light fixture having a performance similar to that of the fixture using right angle film, without the requirement of the insertion of a separate film into the fixture.

SUMMARY OF THE INVENTION

According to the invention a housing defines an optical cavity having an optical window. A source of partially collimated light having an axis of collimation is located inside the optical cavity. A structured surface having a plurality of prisms thereon is positioned within the optical cavity such that the prisms reflect light through the optical window. The peaks of the prisms define a surface at least a portion of which makes an acute angle with the axis of collimation.

DETAILED DESCRIPTION

Figure 1:
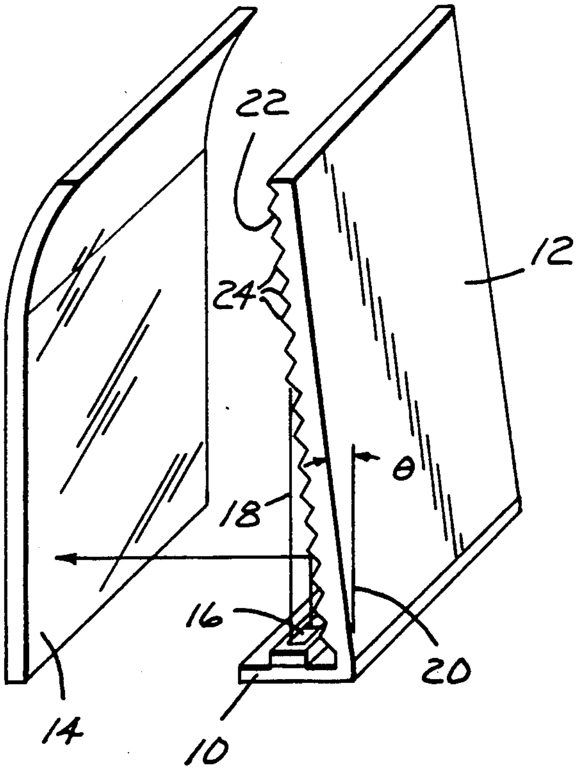
FIG. 1 is a view of a first embodiment of a light fixture according to the invention.

FIG. 1 illustrates a first embodiment of the invention. In the embodiment of FIG. 1 a housing including walls 10 and 12 defines an optical cavity. The optical cavity has an optical window with a light transmitting member 14, therein. Light transmitting member 14 may be of a transparent or translucent material. If desired, light transmitting member 14 could include structures such as pillow optics or Fresnel prisms.

A source of partially collimated light 16 is positioned inside the optical cavity and adjacent side 10 of the housing. Light source 16 may be any source of partially collimated light such as a fluorescent tube or other gas discharge lighting element with an appropriate reflector or an incandescent light with a reflector. Alternatively light source 16 could include a plurality of light emitting diodes (LEDs).

Side 22 of wall 12 is a structured surface having a plurality of, preferably triangular, prisms, 24, thereon. In a preferred embodiment, prisms 24 are linear prisms. Prisms 24 are rendered specularly reflective, typically by aluminum vapor coating. It is only necessary that prisms 24 be specularly reflective on the side adjacent light source 16, but it is typically easier to vapor coat both sides. Such prisms reflect light from light source 16 in a predetermined direction. Typically the predetermined direction will be perpendicular to transparent or translucent material 14.

Light source 16 emits a beam of substantially collimated light having an axis of collimation 18. Line 20 is drawn parallel to collimation axis 18. As may be seen, the peaks of prisms 24 define a planar surface that makes an acute angle $\theta$ with line 20, and thus with collimation axis 18. As a result side 22 of wall 12 cuts through the beam of light emitted by light source 16. Because structured surface 22 so cuts through the beam of light emitted by light source 16, the entire aperture of the optical window is illuminated.

The structure of the present invention may be advantageously formed directly on the rear wall of the light fixture. Such a structure could be formed by injection molding. Alternatively a separate film having the structured surface described above could be placed in the light fixture.

Figure 2:
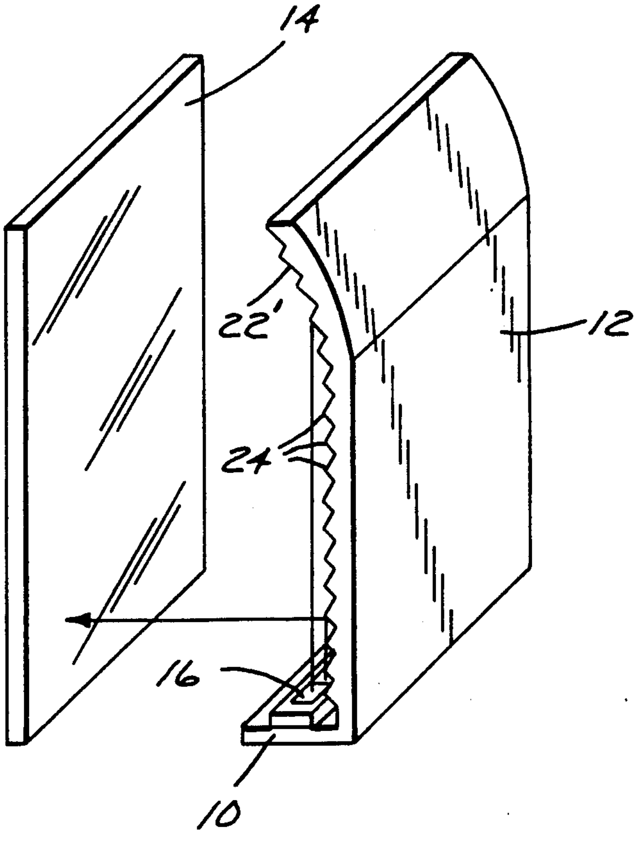
FIG. 2 is a view of a second embodiment of a light fixture according to the invention.

FIG. 2 shows an alternative embodiment to that of FIG. 1. In the embodiment of FIG. 2 structured surface 22' is curved. Thus the surface defined by the peaks of prisms 24 is curved rather than planar. As a result, that surface is parallel or nearly parallel to the axis of collimation in the region closest to light source 16, but forms a variety of acute angles with it in regions more distant from light source 16. This has the effect of causing prisms more distant from light source 16 to intercept a greater portion of the beam than those closer to light source 16. Because the light beam will naturally expand as it progresses to locations distant from the source, the curvature helps to maintain uniformity of illumination.

Figure 3:
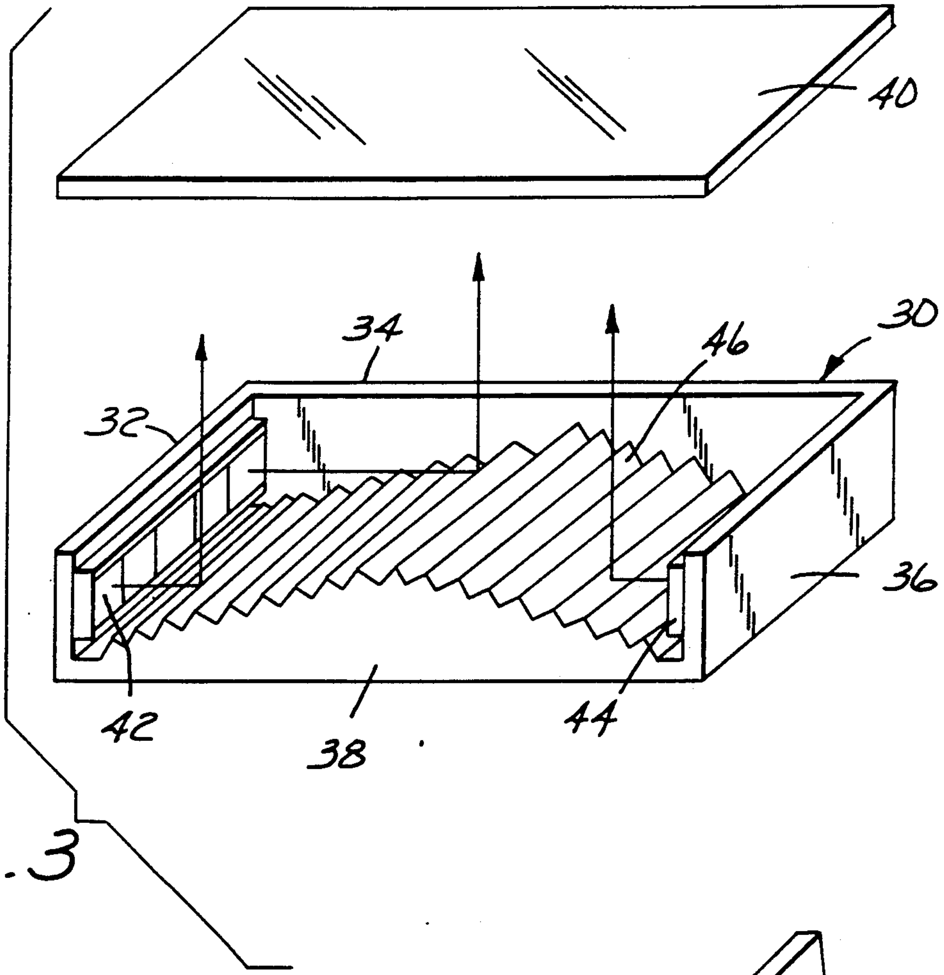
FIG. 3 is a view of a third embodiment of a light fixture according to the invention.

FIG. 3 illustrates an alternative embodiment wherein a housing 30 including walls 32, 34, 36 and 38 defines an optical cavity having an optical window. A transparent or translucent cover 40 lies in the optical window. Light from two partially collimated light sources is directed from light sources 42 and 44 to structured surface 46. The peaks of the prisms of structured surface 46 may define a planar surface lying at an angle to the axis of collimation of the light sources, similar to the embodiment of FIG. 1 or may define a curved surface cutting through the beams of light as in the embodiment of FIG. 2.

Figure 4:
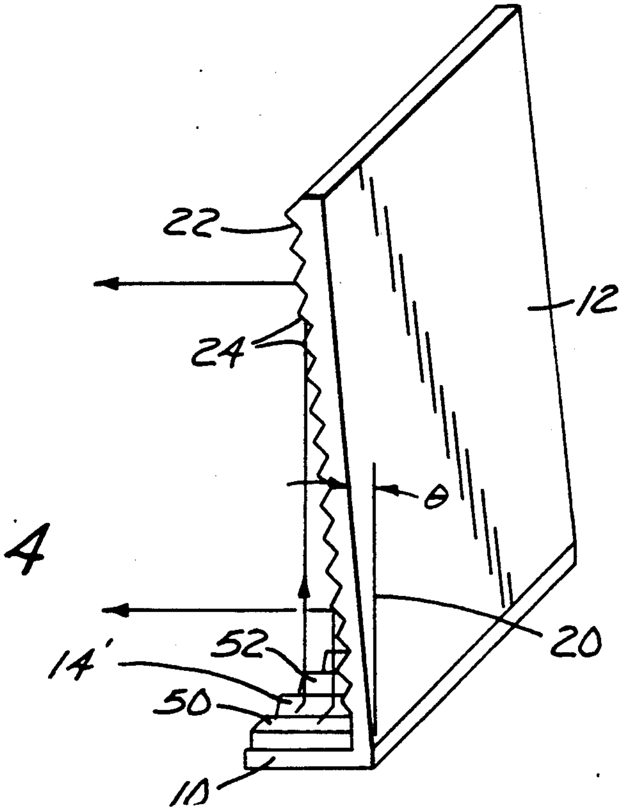
FIG. 4 is a view of a light fixture according to the invention having two light sources.

FIG. 4 illustrates another embodiment of the invention wherein light source 14' includes a light emitter 50 and a structured surface 52. Structured surface 52 acts in a manner similar to structured surface 22 to take light from a compact source 50 and provide a linear beam. The embodiment of FIG. 4 then acts similarly to the embodiment of FIG. 1 with surface 52 acting as a light source for structured surface 54.

I claim:

1. A light fixture comprising:

a housing defining an optical cavity having an optical window, said housing having an inner surface on a side opposite said optical window;

light emitting means in said housing for emitting a partially collimated beam of light having an axis of collimation;

a plurality of prisms on said inner surface, each of said prisms having a specularly reflective surface on a side adjacent said light emitting means for reflecting light from said light emitting means out of said fixture through said optical window, the peaks of said prisms defining a surface, at least a portion of said surface being smoothly curving and forming an acute angle with said axis of collimation such that said optical window will receive a substantially uniform level of illumination.

2. The light fixture of claim 1 further comprising a light transmitting member in said optical window.

3. The light fixture of claim 2 wherein said prisms reflect light from said light emitting means in a direction substantially perpendicular to said light transmitting member.

4. The light fixture of claim 3 wherein each of said specularly reflective surfaces makes an angle substantially equal to forty-five degrees with said axis of collimation.

5. The light fixture of claim 1 wherein said prisms are linear prisms.

* * * * *